Dec. 25, 1962 J. W. GRAY 3,070,796
DUAL AERIAL NAVIGATION SYSTEM
Filed Dec. 7, 1959 6 Sheets-Sheet 1

INVENTOR.
JOHN W. GRAY
BY H. S. Mackey
ATTORNEY

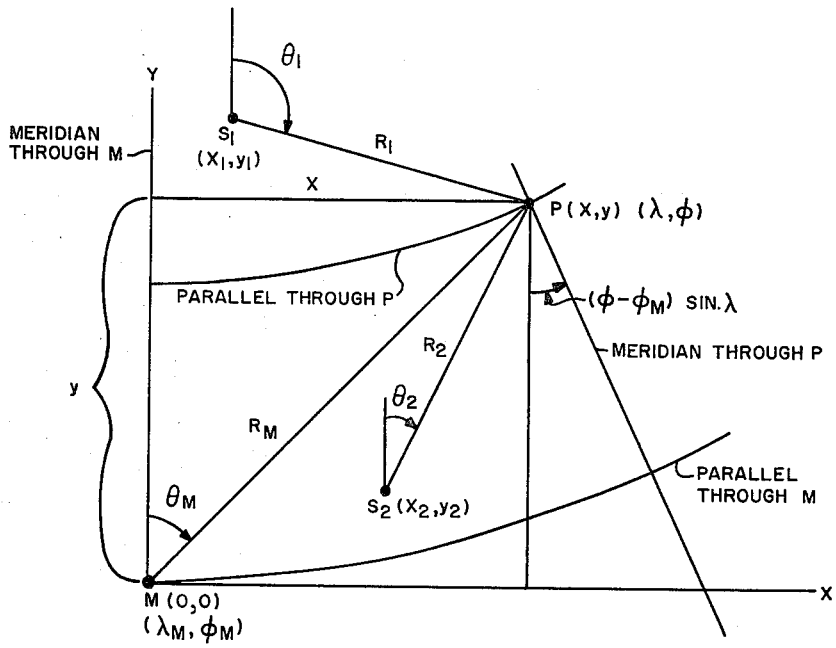
Fig. 3
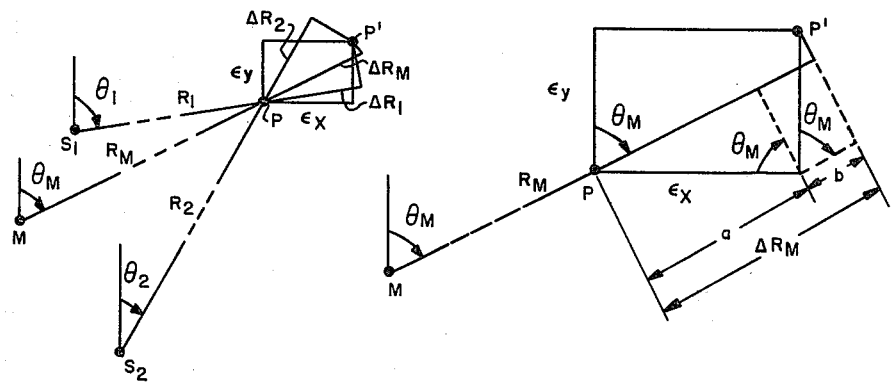
Fig. 5　　　Fig. 6
INVENTOR.
JOHN W. GRAY
BY 
ATTORNEY

INVENTOR.
JOHN W. GRAY

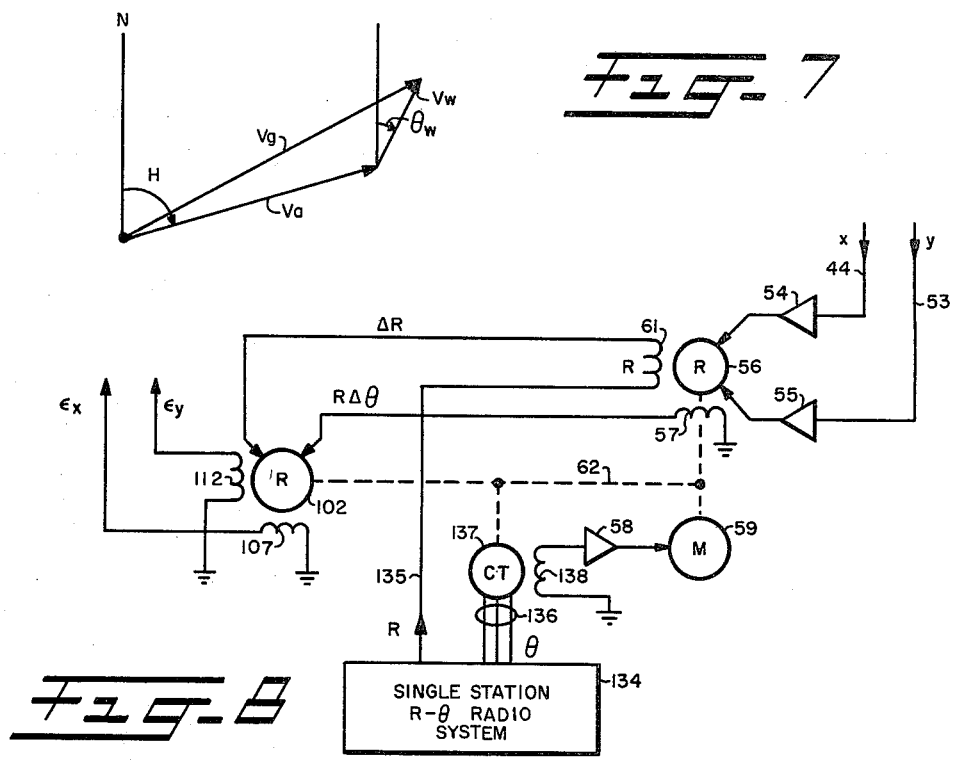
*Fig. 7*
*Fig. 8*
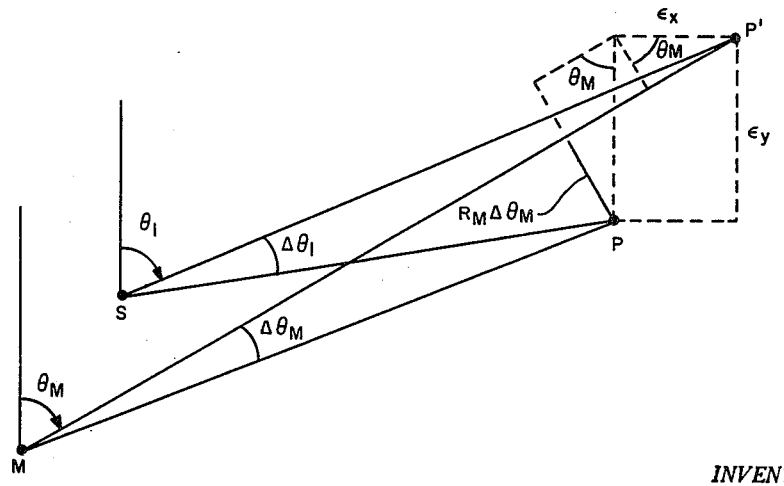
*Fig. 11*
INVENTOR.
JOHN W. GRAY
BY
ATTORNEY

INVENTOR.
JOHN W. GRAY

United States Patent Office 3,070,796
Patented Dec. 25, 1962

3,070,796
DUAL AERIAL NAVIGATION SYSTEM
John W. Gray, Pleasantville, N.Y., assignor to General Precision, Inc., a corporation of Delaware
Filed Dec. 7, 1959, Ser. No. 857,775
16 Claims. (Cl. 343—112)

This invention relates generally to aerial navigation systems and particularly to a dual system in which a self-contained dead reckoning system is corrected continuously by a second system employing signals received from the ground.

Many aircraft are equipped with navigation systems including a dead reckoning position computer in which data representing the initial position of the aircraft are combined with data indicative of speed and direction to obtain a continuous indication of present latitude and present longitude.

Such systems may be constructed to operate anywhere over the surface of the earth, unlimited as to distance, latitude or longitude. The accuracy of the position indication obtained depends upon many factors such as the size, weight and complexity of the computer and the equipment employed for measuring the speed and direction of the aircraft. In all such systems the magnitude of the probable error increases with an increase in the time and distance traveled since the last position fix.

Many systems employing ground radio stations for determining the position of an aircraft in flight are presently in use, one popular system employing three ground transmitters, spaced apart substantially, which transmit signals to the aircraft. The aircraft is equipped with suitable apparatus for determining the difference in the aircraft's distance from the three stations. That is, if the three stations be denoted by M, $S_1$, and $S_2$, and if the distance of the aircraft to each be denoted by $R_M$, $R_1$ and $R_2$, the airborne equipment determines two quantities such as $R_M-R_1$ and $R_M-R_2$. Each of these quantities determines one hyperbola and the intersection of the two hyperbolae determines the present position of the aircraft.

Useful operation of a hyperbolic system as above described is limited to an area in which the signal strength is adequate and to situations in which the position of the aircraft is known with sufficient accuracy to eliminate ambiguity due to repetitive zones. However, within its useful field, a high degree of accuracy is readily obtainable. Comparison of a hyperbolic system with a dead reckoning system shows that the two systems have complementary advantages. The dead reckoning system yields position data of reasonable acuracy with little limitation as to range while the hpyerbolic system permits precise determination of position within a restricted area. It would therefore be desirable to combine the two systems in order to obtain the advantages of each. However, the combination of the two system is made difficult by the different kinds of data produced by the two systems. The dead reckoning system yields data indicative of latitude and longitude while the hyperbolic system gives data indicative of range differences. Additionally, many hyperbolic systems require an operator to receive the data, locate the two hyperbolae on a chart, and read position from the chart.

It is an object of the present invention to provide apparatus for obtaining the advantages of both a dead reckoning navigation system and a system employing ground radio stations.

Another object is to provide apparatus for correcting the position data of a dead reckoning system in accordance with data derived from a ground based system.

Another object is to provide apparatus for interconnecting a dead reckoning system with a hyperbolic system so as automatically and continuously to yield position information based on data received from both systems.

Briefly stated, the data indicative of the present latitude and present longitude of the aircraft as determined by the dead reckoning system are led to the apparatus of the invention which also has inserted into it data indicative of the known position of each of the three ground stations. From these data the apparatus computes the distance of the aircraft from each of the ground stations. From these distances, two distance-differences are found by subtraction and compared with the comparable distance-differences as determined by the hyperbolic system. This comparison yields error signals which, after appropriate conversion, are used to correct the latitude and longitude indications of the dead reckoning system.

For a clearer understanding of the invention reference may be made to the following detailed description and the accompanying drawing, in which:

FIGURE 3 is a diagram showing the geometry of the problem;

FIGURES 5 and 6 are diagrams showing the geometry of the error signal conversion problem;

FIGURE 7 is a vector diagram showing the relation among ground velocity, air velocity and wind velocity;

FIGURES 8, 9 and 10 are schematic diagrams showing how the apparatus of FIG. 4 may be modified to operate with other kinds of ground based navigation systems; and FIGURE 11 is a diagram showing the geometry of the error signal conversion problem encountered with the apparatus of FIG. 10.

Figure 1:
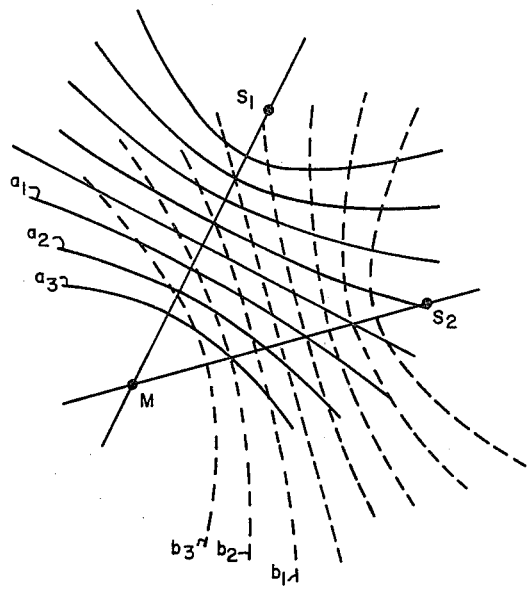
FIGURE 1 is a diagram shown two families of hyperbolae.

Referring first to FIG. 1, there are shown three ground radio stations, a "master" M and two "slave" stations $S_1$ and $S_2$ which form the basis of a typical hyperbolic navigation system. By definition, a hyperbola is a plane curve which is the locus of a point whose distances from two fixed points have a constant difference. A number of hyperbolas, $a_1$, $a_2$, $a_3$, etc., are shown for which M and S are fixed points and $a_1$, $a_2$, $a_3$, etc., are the constant differences. Similar curves $b_1$, $b_2$, $b_3$, etc., are shown for which M and $S_2$ are the fixed points. The three stations transmit suitably coded and synchronized signals so that a receiver aboard the aircraft can determine two range differences, for example, the difference in the aircraft's range to M and $S_1$ ($R_M-R_1$) and the difference in the aircraft's range to M and $S_2$ ($R_M-R_2$). Each range difference determines one hyperbola and the intersection determines the aircraft's position.

The dead reckoning navigation system contemplated by the present invention is independent of ground stations and may, for example, be a Doppler radar system, an inertial system, a wind, air-speed, and magnetic heading system, or any combination thereof. In general, such systems determine two components of the aircraft's horizontal velocity which are integrated to obtain distance increments which in turn are added to the initial position thereby determining present position continuously. As previously mentioned, dead reckoning systems are virtually unlimited in range but suffer from an increase in probable error as the time and distance from the last position fix increases. On the other hand, hyperbolic systems are limited in range but within their operational area are capable of great accuracy.

The general philosophy of the apparatus according to the present invention is to utilize the dead reckoning system with its present position indicators at all times and to correct the indications as often as possible in accordance with data obtained from a hyperbolic system. In general there will be many hyperbolic system such as illustrated in FIG. 1 in various parts of the country whose areas of operation may or may not overlap. The dead reckoning system can determine position by itself when outside of any hyperbolic operational area and can be updated each time an operational area is entered. The present invention is concerned primarily with the apparatus for correcting the dead reckoning system while the aircraft is within the operational area of a hyperbolic system.

The straightforward approach to the correction problem would be to compute latitude and longitude from the distance difference data, compare the result with the latitude and longitude indications of the dead reckoning system and correct the dead reckoning system accordingly. However, when this approach is attempted, it is found that the equations for the transformation and the circuits necessary for solving them are very complex. Accordingly, in the present invention a negative feedback technique is preferred in which the latitude and longitude outputs of the dead reckoning system serve as inputs to a computer whose outputs are range differences which in turn are compared with range differences as determined by the radio system to yield error signals which are fed back to the dead reckoning system to correct its indications.

Figure 2:
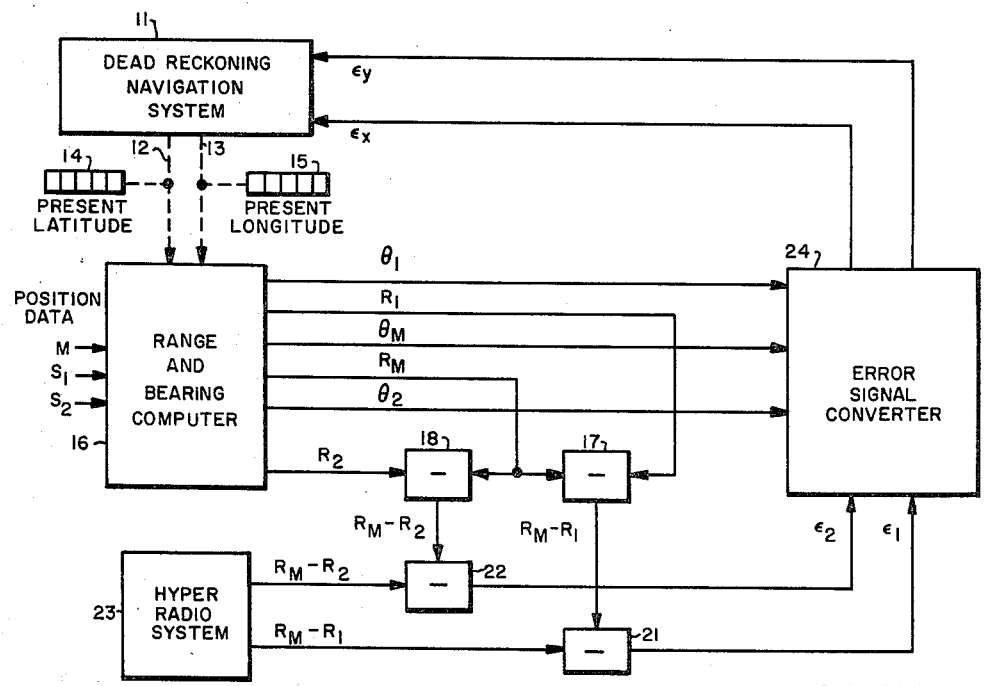
FIGURE 2 is a block diagram of apparatus according to the invention.

Referring now to FIG. 2, there is shown a dead reckoning navigation system 11 which yields outputs on two shafts 12 and 13 indicative of present latitude and present longitude, which information is displayed on counters 14 and 15. The latitude and longitude information on shafts 12 and 13 is fed to a range and bearing computer 16 into which is manually inserted data indicative of the position of each of the radio stations $M_1$, $S_1$ and $S_2$. The computer 16 generates data representing the range R and bearing $\theta$ of the aircraft from each of the radio stations, based on the above input information. The ranges $R_1$ and $R_2$ from the stations $S_1$ and $S_2$ are each subtracted from the range $R_M$ from the station M by two subtraction circuits 17 and 18 in order to obtain $R_M-R_1$ and $R_M-R_2$ representing distance differences as determined by the dead reckoning system. These quantities are compared in circuits 21 and 22 with similar quantities representing the same distance differences as determined by the hyperbolic radio system 23. The resulting error signals $\epsilon_1$ and $\epsilon_2$ represent distance difference errors rather than latitude and longitude errors and must be transformed before being used to correct the dead reckoning system 11. The necessary transformation is made by an error signal converter 24 which, with the aid of the bearing data $\theta_M$, $\theta_1$ and $\theta_2$, generates error signals $\epsilon_x$ and $\epsilon_y$ representing east-west and north-south distance errors and which are applied to the dead reckoning system 11.

The feedback arrangement as above briefly described has a number of advantages over a system which would convert distance differences directly to latitude and longitude. The necessary transformation of coordinates from hyperbolic to latitude-longitude instead of being an open loop device is now performed by the error signal converter 24 which is part of a closed loop system. Also, the coordinate transformation is performed on error signals so that inaccuracies constitute a second order effect since they are largely percentages of distance errors rather than percentages of actual distances. Therefore the components in the converter 24 may be low cost miniature devices since high accuracy is not necessary.

A secondary advantage arises from the fact that the computer 16 computes range and bearing from each station. As will be more fully discussed, this permits the apparatus to be used, with only minor modifications, with ground based radio navigation aids other than hyperbolic systems.

Consider now in more detail the computations performed by the apparatus of FIG. 2, especially the function of the range and bearing computer 16. The computation of the great circle range and bearing from the aircraft to each station is identical to the familiar problem of computing course and distance to a destination. The obvious solution to this problem would be to employ the usual spherical triangle equations which may be solved using five resolvers and two servos, as fully explained in the Gray and Hales Patent No. 2,688,440. This solution assumes a spherical earth but minor corrections can be added to correct for earth ellipticity as explained in the Gray Patent No. 2,843,318. Such a computer, either with or without the ellipticity correction, would be unlimited as to range and latitude but has two disadvantages for purposes of the present problem. The first is the large number of expensive components required for the three range and bearing computations while the second is the limited accuracy attainable. The best resolvers currently available would yield unacceptably large range errors at the short ranges contemplated. In accordance with one feature of the present invention, approximate equations are used which both increase the accuracy obtainable and reduce the complexity of the apparatus.

FIG. 3 is a map showing the master station M at the origin of a rectangular coordinate system X—Y with the aircraft at P $(x, y)$. This map is a conic projection in which the cone, which was later flattened out to produce FIG. 3, was placed on the globe tangent along the parallel through P and points projected on it radially from the globe. The Y axis is the meridian through the master station M and the X axis is a line perpendicular thereto. The meridian through P, which is also a straight line, makes an angle of $(\phi-\phi_M) \sin \lambda$ with the Y axis, where $\lambda$ and $\phi$ are the present latitude and longitude of the aircraft and $\lambda_M$ and $\phi_M$ are the latitude and longitude of the master station M. The distance from P to M is designated $R_M$ and the range line makes an angle $\theta_M$ with the Y axis. The slave station $S_1$ $(x_1, y_1)$ and $S_2$ $(x_2, y_2)$ are shown at ranges $R_1$ and $R_2$ from P and the range lines make angles $\theta_1$ and $\theta_2$ with the Y axis. Since, in the present problem, the angle between the meridians is small (although shown large for clarity in FIG. 3) and the range is not too great, good approximations to the coordinates of P can be made. The arc defining the parallel through P is proportional to $(\phi-\phi_m) \cos \lambda$ in length and this is a sufficiently close approximation to $x$. The distance along the Y axis between the parallels is proportional to $(\lambda-\lambda_M)$ and it can easily be shown that the small part of $y$ between the arc and the chord is approximately proportional to $$\frac{(\phi-\phi_M)^2 \sin 2\lambda}{4}$$

Accordingly, the range and bearing computer 16 determines the coordinates $(x, y)$ by instrumenting the following equations:

$$x = (\phi-\phi_M) \cos \lambda \qquad (1)$$

$$y = (\lambda-\lambda_M) + \frac{(\phi-\phi_M)^2 \sin 2\lambda}{4} \qquad (2)$$

In the above equations the radius of the earth has been omitted because it would appear as a common factor and would represent only a proportionality constant or scale factor and therefore need not be instrumented. The locations of the slave stations $S_1$ and $S_2$ are known and accordingly their coordinates may be inserted manually. The ranges $R_M$, $R_1$ and $R_2$ and the bearings $\theta_M$, $\theta_1$ and $\theta_2$ are computed by servoed resolvers.

Figure 4:
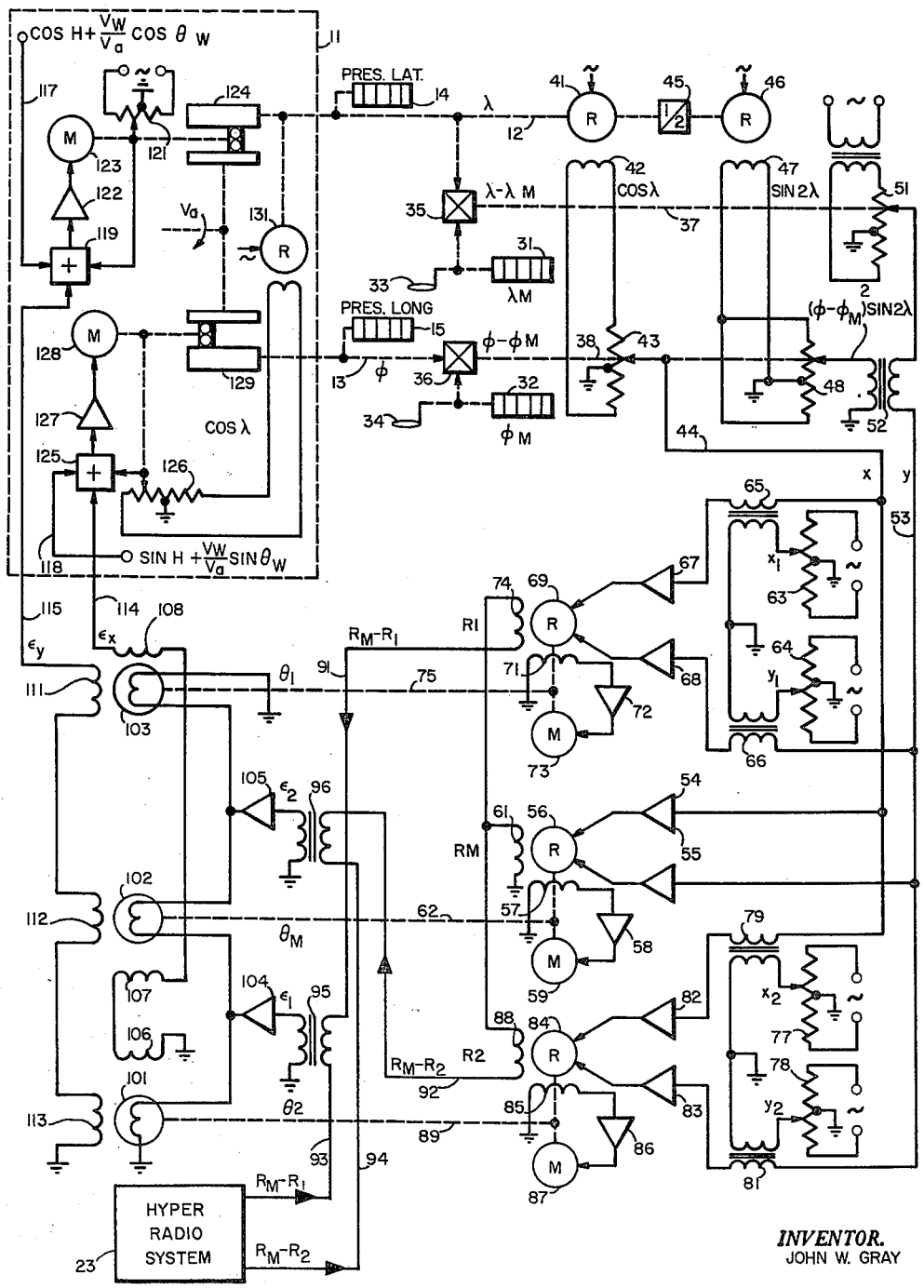
FIGURE 4 is a circuit diagram of a preferred embodiment of the invention.

Referring now to FIG. 4, there is shown the outline of a dead reckoning system 11 and, for illustrative purposes, certain components of one particular system are also shown. These components will be described subsequently when the application of the error signals $\epsilon_x$ and $\epsilon_y$ to the system 11 is described. For the present it is sufficient to note the output shafts 12 and 13 and the counters 14 and 15 which indicate continuously the present latitude and present longitude of the aircraft.

Two revolution counters 31 and 32 are shown which may be manually set by cranks 33 and 34 to display the latitude $\lambda_M$ and longitude $\phi_M$ respectively, of the master station M. These counters are each connected to inputs of mechanical differentials 35 and 36 respectively, the other inputs of which are connected to the shafts 12 and 13 the positions of which represent $\lambda$ and $\phi$ respectively. The angular positions of the output shafts 37 and 38 therefore are indicative of $(\lambda - \lambda_M)$ and $(\phi - \phi_M)$ respectively.

The shaft 12 is also connected to the rotor of a resolver 41 which is energized by alternating current. One winding 42 therefore has induced therein a voltage proportional to $\cos \lambda$ which voltage is applied to the extremities of a linear potentiometer 43 having a grounded center tap. The slider of the potentiometer 43 is positioned by the shaft 38 and accordingly bears a voltage proportional to $(\phi - \phi_M) \cos \lambda$. As can be seen from Equation 1, this voltage is proportional to $x$ and appears on conductor 44 which is connected to the slider of the potentiometer 43.

The shaft 12 is also connected to the input of a 1:2 step-up gear box 45, the output of which is connected to position the rotor of a resolver 46, energized by alternating current. The rotor is thus positioned at the angle $2\lambda$ and one winding 47 has induced therein a voltage proportional to $\sin 2\lambda$ which voltage is applied between the grounded center tap and both extremities of a potentiometer 48. The potentiometer 48 has a square taper, that is, the voltage of the slider is proportional to the exciting voltage times the square of the displacement from the center tap. The slider is positioned by the shaft 38 and accordingly the voltage of the slider is proportional to $(\phi - \phi_M)^2 \sin 2\lambda$.

A linear potentiometer 51 having a grounded center tap has its extremities connected to a source of alternating current and has its slider positioned in accordance with the angle $(\lambda - \lambda_M)$ by connection to the shaft 37. The slider of potentiometer 51 therefore bears a voltage proportional to $(\lambda - \lambda_M)$ and this voltage is added to that of the slider of the potentiometer 48 by means of a transformer 52. The resulting voltage appears on a conductor 53 and, as can be seen from Equation 2, is proportional to $y$.

It will be recalled that $x$ and $y$ represent the rectangular coordinates of the aircraft with respect to the master station M and in order to compute the range $R_M$ and the bearing $\theta_M$, the conductors 44 and 53 are connected through booster amplifiers 54 and 55 respectively to the input windings of a resolver 56. The booster amplifiers 54 and 55 serve to isolate the resolver 56 from the circuits of conductors 44 and 53, prevent loading of these circuits, provide precisely controlled gain, compensate for phase shift, and provide a low impedance source for energizing the resolver 56. One winding 57 of the resolver 56 is connected to a servo amplifier 58 which controls a motor 59 which in turn positions the rotor of the resolver 56 until the voltage of winding 57 becomes zero. At this time the voltage of the other winding 61 will be indicative of the range, $R_M$, of the aircraft from the master station M and the angular position of the shaft 62, connected to the resolver 56 and the motor 59, will represent the bearing, $\theta_M$.

In order to compute the range $R_1$ and the bearing $\theta_1$ of the aircraft with respect to the station $S_1$, it is first necessary to compute the coordinate distances. It will be recalled that $x_1$, $y_1$ represent the coordinates of the station $S_1$ with respect to the master station M and if these coordinates be added to the coordinates $x$, $y$ the required coordinate distances are obtained. Accordingly, two potentiometers 63 and 64 are provided, each with a grounded center tap and each excited by a source of alternating voltage connected across the extremities. The two sliders are manually positioned so that their voltages represent the known, fixed coordinates $x_1$, $y_1$ and these voltages are added to the voltages of conductors 44 and 53 by means of transformers 65 and 66 respectively. The resulting voltages are led to the input circuits of two booster amplifiers 67 and 68 respectively, the outputs of which energize the rotor windings of a resolver 69. One stator winding 71 is connected to a servo amplifier 72 which controls a motor 73 which in turn positions the rotor of the resolver 69 until the voltage of winding 71 is zero. At this time the voltage of the other winding 74 is indicative of the range $R_1$ while the angular position of the shaft 75, connected to the motor 73 and the resolver 69, represents the bearing $\theta_1$.

The range $R_2$ and the bearing $\theta_2$ are computed in a similar fashion. Two potentiometers 77 and 78 having grounded center taps and excited by alternating current have their sliders positioned so that their voltages are indicative of $x_2$ and $y_2$ respectively. These voltages are added to the voltages of conductors 44 and 53 by means of transformers 79 and 81 respectively, and the resulting voltages serve as inputs to two booster amplifiers 82 and 83 the outputs of which energize the rotor windings of a resolver 84. As before, one stator winding 85 is connected to a servo amplifier 86 which controls a motor 87. The motor 87 angularly positions the rotor of the resolver 84 until the voltage of winding 85 is zero at which time the voltage of the winding 88 represents the range $R_2$ while the angular position of the shaft 89, connected to the motor 87 and the resolver 84, represents the angle $\theta_2$.

The voltage of the winding 74 representing $R_1$ is subtracted from the voltage of winding 61 representing $R_M$ by a series connection to obtain a voltage with respect to ground on a conductor 91 indicative of $R_M - R_1$ as determined by the dead reckoning navigation system 11. Similarly, the voltage of the winding 88 representing $R_2$ is subtracted from the voltage of the winding 61 representing $R_M$ thereby obtaining a voltage on a conductor 92 representing $R_M - R_2$ as determined by the dead reckoning system 11. At the same time there are developed voltages on conductors 93 and 94 representing $R_M - R_1$ and $R_M - R_2$ respectively as determined by the hyperbolic radio system 23. The voltages on conductors 91 and 93 are compared in a transformer 95 to generate an error signal $\epsilon_1$ representing the difference in the quantity $R_M - R_1$ as determined by the two systems. Similarly, the voltages on conductors 92 and 94 are compared in a transformer 96 to generate an error signal $\epsilon_2$ representing the difference in the quantity $R_M - R_2$ as determined by the two systems. The error signals $\epsilon_1$ and $\epsilon_2$ thus represent distance difference errors which must be transformed, or converted, before being used to correct the indications of the dead reckoning system 11.

Turning now to FIG. 5, there are shown the stations M, $S_1$ and $S_2$, and the point P which represents the position of the aircraft as determined by the dead reckoning system 11. The point P' represents the actual position of the aircraft, that is, the position as determined by the hyperbolic system 23, and is displaced from the point P by east-west and north-south incremental distances $\epsilon_x$ and $\epsilon_y$. The corresponding range differences are denoted $\Delta R_M$, $\Delta R_1$ and $\Delta R_2$.

FIG. 6 is an enlarged view of the geometry in the vicinity of P and P' in which the range increments $\Delta R_1$ and $\Delta R_2$ have been omitted, only the increment $\Delta R_M$ being shown. It is obvious from FIG. 6 that $$\Delta R_M = a + b = \epsilon_x \sin \theta_M + \epsilon_y \cos \theta_M \quad (3)$$

Similarly, $$\Delta R_1 = \epsilon_x \sin \theta_1 + \epsilon_y \cos \theta_1 \quad (4)$$
$$\Delta R_2 = \epsilon_x \sin \theta_2 + \epsilon_y \cos \theta_2 \quad (5)$$

The range difference errors are $$\epsilon_1 = \Delta(R_M - R_1) = \Delta R_M - \Delta R_1 \quad (6)$$
$$\epsilon_2 = \Delta(R_M - R_2) = \Delta R_M - \Delta R_2 \quad (7)$$

Substituting Equations 3, 4 and 5 in Equations 6 and 7 and solving for $\epsilon_x$ and $\epsilon_y$, it is found that $$\epsilon_x = \frac{\epsilon_1 \cos \theta_2 - \epsilon_2 \cos \theta_1 - (\epsilon_1 - \epsilon_2) \cos \theta_M}{4 \sin \frac{\theta_1 - \theta_2}{2} \sin \frac{\theta_1 - \theta_M}{2} \sin \frac{\theta_M - \theta_2}{2}} \quad (8)$$

$$\epsilon_y = \frac{\epsilon_2 \sin \theta_1 - \epsilon_1 \sin \theta_2 + (\epsilon_1 - \epsilon_2) \sin \theta_M}{4 \sin \frac{\theta_1 - \theta_2}{2} \sin \frac{\theta_1 - \theta_M}{2} \sin \frac{\theta_M - \theta_2}{2}} \quad (9)$$

The denominator in Equations 8 and 9 is not a function of the error signals and therefore it is only necessary to compute the numerators. The denominator is, however, a measure of the feedback error signal sensitivity in volts per mile; the smaller it is the greater will be the loop time constant.

Returning now to FIG. 4, $\epsilon_x$ and $\epsilon_y$ are computed by means of three resolvers 101, 102 and 103 positioned by shafts 89, 62 and 75 respectively to the angles $\theta_2$, $\theta_M$ and $\theta_1$. The voltage $\epsilon_1$ from transformer 95 is passed through an amplifier 104 and excites the resolver 101; the voltage $\epsilon_2$ is passed through an amplifier 105 and excites the reslover 103; while the resolver 102 is excited by $(\epsilon_1 - \epsilon_2)$. The voltage $\epsilon_x$ is made up of the voltage induced in winding 106 of the resolver 101, proportional to $\epsilon_1 \cos \theta_2$, from which is subtracted the voltage induced in winding 107 of the resolver 102, proportional to $(\epsilon_1 - \epsilon_2) \cos \theta_M$, and the voltage induced in the winding 108 of the resolver 103, proportional to $\epsilon_2 \cos \theta_1$. The voltage $\epsilon_y$ is made up of the voltage induced in the winding 111 of the resolver 103, proportional to $\epsilon_2 \sin \theta_1$, to which is added the voltage induced in the winding 112 of the resolver 102, proportional to $(\epsilon_1 - \epsilon_2) \sin \theta_M$, and from which is subtracted the voltage induced in the winding 113 of the resolver 101, proportional to $\epsilon_1 \sin \theta_2$. The voltages $\epsilon_x$ and $\epsilon_y$ appear on conductors 114 and 115 respectively.

An ideal transformation would require coordinate rotation of the errors through an angle $(\phi - \phi_M) \sin \lambda$ to obtain signals for aircraft latitude-longitude correction. Such a refinement would require an additional servo and is deemed superfluous because the angle involved is so small.

The three resolvers 101, 102 and 103 may be of quite low precision without impairing the system accuracy because, when $\epsilon_x$ and $\epsilon_y$ are brought to zero, $\epsilon_1$ and $\epsilon_2$ will also be zero. Similarly, the amplifiers 104 and 105 need not be precision devices, simple cathode follower or emitter follower stages being sufficient. Additionally it is noted that the servos including the resolvers 69, 56 and 84 need not be very sensitive in their computation of the angles $\theta_M$, $\theta_1$ and $\theta_2$. The electrical range outputs must be precise but a degree or two of angular error has negligible effect on them.

The error voltages $\epsilon_x$ and $\epsilon_y$ on conductors 114 and 115 are applied to the dead reckoning system 11 to correct the position indications on counters 14 and 15. The correction may be applied in various ways. For example, it would be possible to convert the error voltages to shaft positions and add them mechanically to the shafts 12 and 13. However, dead reckoning computers include mechanical or electronic integrators of one kind or another by means of which velocity signals are converted to distance or position indications and in general it is preferred to add the corrections to the inputs of the integrators in order to take advantage of smoothing action of the integrators. The interconnections may vary according to the type of computer used but for illustrative purposes the preferred connections to a specific computer are shown.

Within the dashed outline there is shown a portion of a specific computer which includes two conductors 117 and 118 to which are applied voltages proportional to $$\cos H + \frac{V_w}{V_a} \cos \theta_w \quad (10)$$

and $$\sin H + \frac{V_w}{V_a} \sin \theta_w \quad (11)$$

respectively. The manner in which these voltages are derived is immaterial to an understanding of the present invention but the nature of these voltages can be seen by reference to FIG. 7.

Referring now to FIG. 7, there is shown a vectorial representation of an aircraft proceeding through an air mass with an air velocity $V_a$ making an angle $H$ with true north. Wind is represented by the wind vector $V_w$ at an angle $\theta_w$ with respect to north. The ground velocity $V_g$ is the vectorial sum of $V_a$ and $V_w$. It is obvious from FIG. 7 that the north-south component of ground velocity is equal to $$\text{N-S vel} = V_a \cos H + V_w \cos \theta_w \quad (12)$$

Similarly, the east-west velocity is equal to $$\text{E-W vel} = V_a \sin H + V_w \sin \theta_w \quad (13)$$

It is obvious that Expressions 10 and 11 are Expressions 12 and 13 divided by $V_a$ so that Expressions 10 and 11 represent dimensionless quantities which, if multiplied by air speed, would yield N-S and E-W velocity components. The latter components, if integrated with respect to time, would yield distance components. In the computer illustrated, the multiplication and integration are performed simultaneously.

Returning to FIG. 4, the voltage of conductor 117 is compared in a circuit 119 with the voltage on the slider of a linear potentiometer 121 provided with a grounded center tap and excited with alternating current. The difference in these voltages is led to a servo amplifier 122 which controls a motor 123 which in turn positions the slider of the potentiometer 121 so that the position of the slider represents the same quantity as the voltage of conductor 117. The motor 123 and the slider of the potentiometer 121 are mechanically connected so as to position the ball carriage of a ball-disk-cylinder integrator 124 the disk of which is rotated at a speed proportional to air speed, $V_a$. Therefore the angular position of the shaft 12, connected to the cylinder of the integrator 124, is indicative of N-S position, or latitude.

In a similar fashion, the voltage of the conductor 118 is compared in a circuit 125 with the voltage of the slider of a potentiometer 126 to generate a signal which, through a servo amplifier 127, controls a motor 128 the shaft of which positions both the slider of the potentiometer 126 and the ball carriage of an integrator 129 the disk of which is also rotated at a speed proportional to air speed. The potentiometer 126, instead of being excited by a constant alternating voltage, is excited by a voltage proportional to the cosine of present latitude $(\cos \lambda)$ by connection to one winding of a resolver 131 which is energized by alternating current and the rotor of which is connected to the shaft 12. Therefore, the angular position of the shaft 13, connected to the cylinder of the integrator 129, instead of representing E-W position, represents present longitude.

The error signals $\epsilon_x$ and $\epsilon_y$ are applied to the dead reckoning system 11 by connecting conductors 114 and 115 to the combining circuits 125 and 119 respectively so that the signals $\epsilon_x$ and $\epsilon_y$ contribute to the positioning of the ball carriages of the integrators and thereby correct the position indications of counters 15 and 14. Correction is made gradually and without interfering in any way with the normal operation of the system 11.

It is noted that the computer of FIG. 4 determines ground ranges while the hyperbolic radio system 23 determines slant ranges. This of course introduces an error which, although large in the immediate vicinity of the stations (especially at high altitudes), rapidly diminishes as the distance from the station increases and is quite small throughout most of the operational area. It is therefore desirable to limit operation of the device to distances at which the error introduced is acceptably small. Alternatively, the computer 16 could be modified to compute slant range by applying suitable corrections to the voltages induced in windings 74, 61 and 88.

An interesting and advantageous feature of the present invention is the ease with which it may be modified to operate with ground based systems other than hyperbolic systems. This adaptability is due in a large part to the presence of the three servos normally used to compute the range and bearing to the three stations.

FIG. 8 shows how the computer can be connected to operate with a single station from which range and bearing can be obtained. There is shown in block form the radio system 134 which yields a range output in the form of a voltage on the conductor 135 and a bearing output in the form of three wire synchro data on the conductors 136. Also shown are certain components of the equipment of FIG. 4, including the resolver 102, the resolver 56, the servo amplifier 58 and the motor 59. The resolvers 101, 103, 69 and 84 are not used. The only additional equipment required is a synchro control transformer 137, the stator windings of which are connected to the conductors 136.

The latitude and longitude of the radio station are entered on the counters 31 and 32 (FIG. 4) so that the conductors 44 and 53 bear voltages proportional to the coordinates $x$ and $y$ of the aircraft with respect to the station, which voltages are applied through the booster amplifiers 54 and 55 to the resolver 56 as before. The shaft 62 is connected to the motor 59, the resolver 56 and the resolver 102 as before and in addition is connected to the rotor of the control transformer 137. The input to the servo amplifier 58, instead of being connected to the winding 57 of the resolver 56, is connected to the rotor winding 138 of the control transformer 137. As a result, the shaft 62 is positioned at the bearing angle $\theta$ as determined by the radio system 134. If this angle is not the same as the bearing angle as determined by the dead reckoning system, the voltage of winding 57, instead of being zero, will be proportional to the lateral position error, $R\Delta\theta$, and this error signal is applied to one winding of the resolver 102. The range voltage on the conductor 135 is subtracted from the range voltage induced in the winding 61 by a series connection and the resulting error signal is also applied to the resolver 102. The resolver rotates the coordinates of these error signals through the angle $\theta$ so that the error signals $\epsilon_x$ and $\epsilon_y$ may be taken from the windings 107 and 112 and applied to the dead reckoning system 11 as before.

Figure 9:
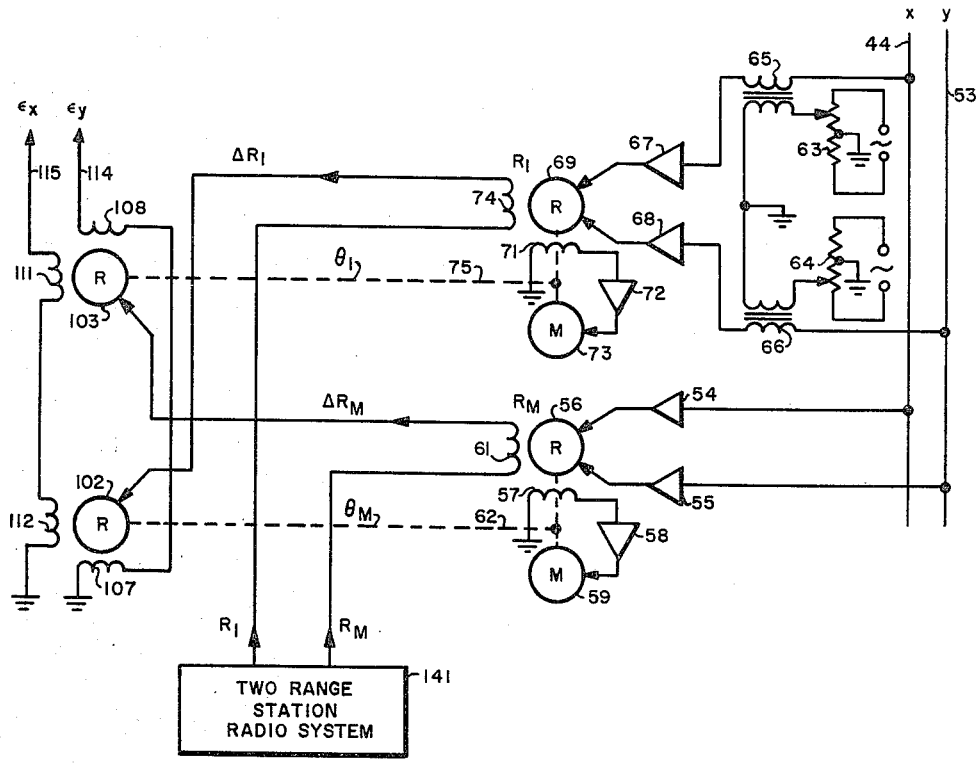

FIG. 9 shows how the computer may be used to operate with a two range station system. There is shown in block form a radio system 141 from which are obtained two voltages each proportional to the range of the aircraft from one of the ground stations. Also shown are a number of the components of FIG. 4, including the resolvers 56, 69, 102 and 103. The resolvers 84 and 101 are not used.

The latitude and longitude of one of the stations are entered in the counters 31 and 32 (FIG. 4) as if it were a master station. The rectangular coordinates of the second station with respect to the first are entered as $x_1$ and $y_1$ on the potentiometers 63 and 64. The range and bearing of each station are computed as in the case of FIG. 4, the ranges appearing as the voltages induced in windings 61 and 74 and the bearings appearing as the position of shafts 62 and 75. The ranges $R_1$ and $R_M$ as determined by the radio system 141 are subtracted from the computed ranges by a series connection and the resulting error signals are applied to the resolvers 102 and 103. These error signals are range error signals and must be transformed or converted to north-south and east-west error signals. The range error signals are given by Equations 3 and 4 which when solved for $\epsilon_x$ and $\epsilon_y$ show that $$\epsilon_x = \frac{\Delta R_1 \cos \theta_M - \Delta R_M \cos \theta_1}{\sin (\theta_1 - \theta_M)} \quad (14)$$

$$\epsilon_y = \frac{\Delta R_M \sin \theta_1 - \Delta R_1 \sin \theta_M}{\sin (\theta_1 - \theta_M)} \quad (15)$$

Since the denominator is not a function of the error signals, only the numerators need be computed. However, as before, the denominator is a measure of the error signal sensitivity. The numerator of Equation 14 is computed by connecting windings 111 and 112 in series, with due regard for sign, while the numerator of Equation 15 is similarly computed by connecting windings 107 and 108 in series.

Figure 10:
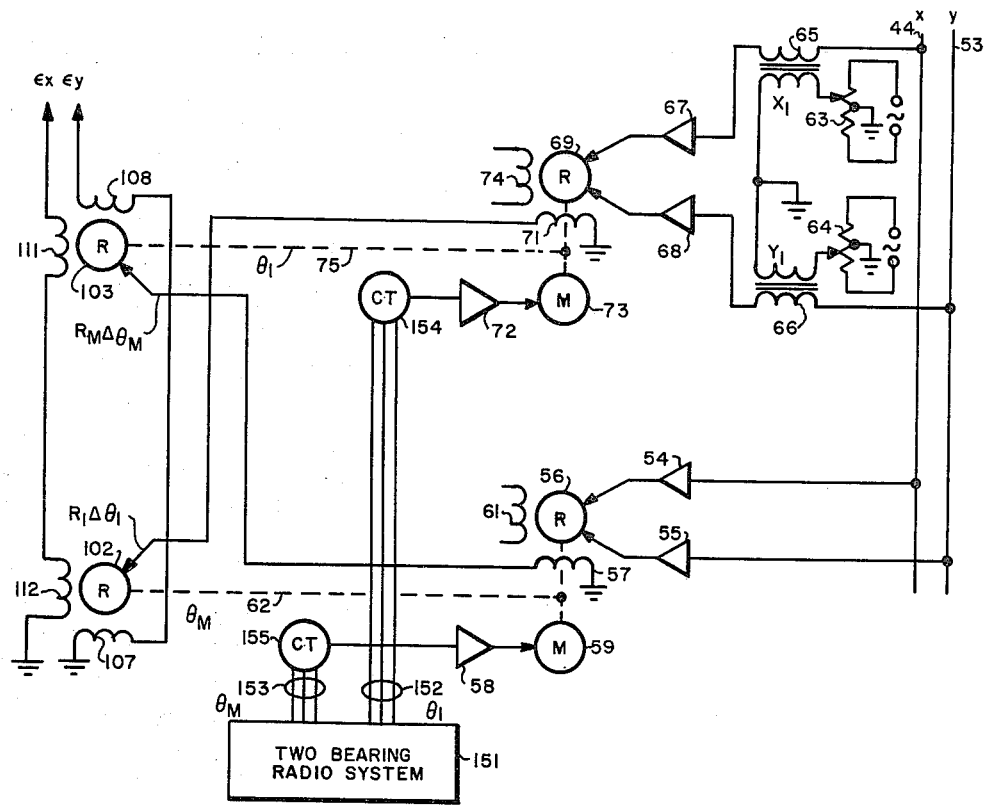

FIG. 10 shows how the apparatus can be connected to operate with a radio system from which are obtained data indicative of the bearings with respect to two ground stations. There is shown in block form the radio system 151 which yields bearing outputs in the form of three wire synchro data on conductors 152 and 153. Also shown are a number of components of the equipment of FIG. 4, including the resolvers 56, 69, 102 and 103. Additionally, there are shown two synchro control transformers 154 and 155, the stators of which are connected to the conductors 152 and 153 respectively.

The latitude and longitude of one of the stations, designated M, are entered on the counters 31 and 32 (FIG. 4) as if it were a master station so that the conductors 44 and 53 bear voltages proportional to the coordinates $x$ and $y$ of the aircraft with respect to this station. These voltages are applied through the booster amplifiers 54 and 55 to the rotor windings of the resolver 56 as in the case of FIG. 4. The coordinates $x_1$, $y_1$ of the second station, designated S, with respect to the first are entered on the potentiometers 63 and 64 and the resulting coordinates with respect to the aircraft are applied as before through the booster amplifiers 67 and 68 to the rotor windings of the resolver 69.

The synchro control transformer 155 receives the three wire data of conductors 153 representing the bearing $\theta_M$ of the station M. The rotor winding of the control transformer 155 is connected to the servo amplifier 58 which controls the motor 59 the shaft of which is connected to the rotor of the resolvers 56 and 102. Thus the rotors of these resolvers are positioned at the true bearing, that is, the bearing as determined by the radio system 151. If this bearing is not the same as the bearing defined by the coordinates $x$, $y$ as determined by the dead reckoning system, the voltage of winding 57, instead of being zero, will be proportional to the lateral position error, $R_M\Delta\theta_M$.

Similarly, the control transformer 154 positions the rotors of resolvers 69 and 103 at the true bearing $\theta_1$ so that a voltage proportional to the lateral displacement error $R_1\Delta\theta_1$ is induced in the winding 71. The two lateral displacement errors, $R_M\Delta\theta_M$ and $R_1\Delta\theta_1$, must be transformed to east-west and north-south error signals $\epsilon_x$ and $\epsilon_y$ before application to the dead reckoning system 11.

Referring now to FIG. 11, there are shown the two stations M and S, the point P which represents the position of the aircraft as determined by the dead reckoning system 11, and the point P' which represents the true position of the aircraft, that is, the position as determined by the radio system 151. It is obvious that $$R_M\Delta\theta_M = \epsilon_y \sin \theta_M - \epsilon_x \cos \theta_M \quad (16)$$

Similarly, $$R_1\Delta\theta = \epsilon_y \sin \theta_1 - \epsilon_x \cos \theta_1 \quad (17)$$

Solving Equations 16 and 17 for $\epsilon_x$ and $\epsilon_y$ it is found that $$\epsilon_x = \frac{R_M\Delta\theta_M \sin \theta_1 - R_1\Delta\theta_1 \sin \theta_M}{\sin (\theta_M - \theta_1)} \quad (18)$$

$$\epsilon_y = \frac{R_M\Delta\theta_M \cos \theta_1 - R_1\Delta\theta_1 \cos \theta_M}{\sin (\theta_M - \theta_1)} \quad (19)$$

The denominator in Equations 18 and 19 is not a function of the error signals and need not be computed although, as before, it is a measure of the error signal sensitivity. The numerators are computed as shown in FIG. 10, by the resolvers 102 and 103. The winding 57, bearing a voltage proportional to $R_M \Delta \theta_M$, is connected to one rotor winding of the resolver 103 while the winding 71, bearing a voltage proportional to $R_1 \Delta \theta_1$ is connected to one rotor winding of the resolver 102. $\epsilon_x$ is obtained by connecting the windings 111 and 112 in series, with due regard for sign while $\epsilon_y$ is obtained similarly by connecting the windings 107 and 108 in series, also with due regard for sign. $\epsilon_x$ and $\epsilon_y$ are connected to the dead reckoning system 11 as shown in FIG. 4.

It is thus apparent that the present invention has many important features, a few of which will be mentioned. First, the invention enables the present position of an aircraft to be determined by a combination of a dead reckoning system and a ground based radio system, combining the advantages of both systems. Second, instead of the more difficult straightforward approach of computing latitude and longitude from hyperbolic data in an open loop device, the negative feedback technique employed makes the coordinate transformation a part of a closed loop device.

Third, the use of the negative feedback technique makes it possible to introduce the corrections to the existing integrators thereby obtaining data smoothing without the necessity for additional components for this purpose.

Fourth, the use of approximate equations instead of the standard great circle equations for the computation of range and bearing results in a simpler instrumentation and better accuracy. Fifth, the error signal transformation can be done with low precision components since inaccuracies are a percentage of distance errors rather than a percentage of actual distances. Sixth, the apparatus can be used with various ground based systems with only minor modifications.

Although several specific embodiments have been described, many modifications may be made within the spirit of the invention. It is therefore desired that the protection afforded by Letters Patent be limited only by the true scope of the appended claims.

What is claimed is:

1. Aerial navigation equipment comprising, a first airborne system including a dead reckoning computer having a pair of integrators for continuously summing information representing aircraft speed and direction to generate data representing distance traveled and present position of said aircraft, a second airborne system for receiving signals from the ground and for generating therefrom data indicative of the present position of said aircraft, means for generating error signals indicative of the difference in the position data generated by said two systems, and means for applying said error signals as additional inputs to said integrators whereby the position data generated by said first system is corrected in accordance with the data generated by said second system.

2. Aerial navigation equipment comprising, a first airborne navigation system including a dead reckoning position computer for continuously generating data indicative of the present latitude and present longitude of the aircraft, a second airborne system for receiving radio signals from the ground and for generating therefrom data indicative of the position of said aircraft with respect to one or more ground points of known latitude and longitude, means for converting said data indicative of latitude and longitude to position data comparable to that generated by said second system, means for comparing the converted data with the data generated by said second system and for generating error signals representing the difference in the position of said aircraft as determined by said two systems, and means responsive to said error signals for adjusting the latitude and longitude data generated by said first system so as to bring said error signals to zero.

3. Aerial navigation equipment comprising, a first airborne system including a pair of integrators for continuously summing information representing aircraft speed and direction to generate data representing present latitude and longitude of said aircraft, a second airborne system for receiving signals from the ground and for generating therefrom data indicative of the position of said aircraft with respect to one or more ground points of known latitude and longitude, means for converting said data indicative of latitude and longitude to position data comparable to that generated by said second system, means for comparing the converted data with the data generated by said second system and for generating error signals representing the difference in the position of said aircraft as determined by said two systems, and means for applying said error signals as additional inputs to said integrators whereby the position data generated by said first system is corrected in accordance with the data generated by said second system.

4. Aerial navigation equipment comprising, first and second navigation systems each for generating data representing the difference in an aircraft's distance from first and second points and from said first and third points, means for comparing the distance-difference data as generated by said first and second systems to obtain distance-difference error signals, and means for transforming said distance-difference error signals to rectangular coordinate distance error signals.

5. Aerial navigation equipment comprising, a first navigation system for generating continuously data indicative of the position of an aircraft in terms of first and second signals representing the difference in said aircraft's distance from a first and a second point and from said first and a third point, respectively, a second navigation system for generating continuously data indicative of the position of said aircraft in terms of third and fourth signals representing the difference in said aircraft's distance from said first and second points and from said first and third points respectively, means for comparing said first signal with said third signal and said second signal with said fourth signal to generate fifth and sixth signals representing the errors in the distance-differences as determined by said two systems, and means for transforming said fifth and sixth signals to seventh and eighth signals representing rectangular coordinate differences in said aircraft's position as determined by said two systems.

6. In aerial navigation equipment which includes first and second navigation systems each generating data representing the difference in an aircraft's distance from first and second points and from first and third points and which further includes means for comparing the distance-difference data as generated by said first and second systems to obtain first and second distance-difference error signals, means for transforming the distance-difference error signals to rectangular coordinate error signals comprising, first, second and third resolvers each having a rotor winding and first and second orthogonal stator windings, means for positioning the rotors of said resolvers at angles representing the direction with respect to north of the lines joining said aircraft to said first, second and third points respectively, means for energizing the rotor winding of said first resolver with a voltage proportional to said second error signal, means for energizing the rotor winding of said second resolver with a voltage proportional to said first error signal, means for energizing the rotor winding of said third resolver with a voltage proportional to the difference between said first and second error signals, means for connecting said first stator windings of each of said resolvers in series with a first output conductor and ground with said first winding of said second resolver opposed to said first windings of said first and third resolvers, and means for connecting said second stator windings of each of said resolvers in series with a second output conductor and ground with said second winding of said second resolver opposed to said second windings of said first and third resolvers.

7. Aerial navigation equipment comprising airborne apparatus for receiving radio signals from first, second and third ground stations of known positions and for generating from said signals first and second quantities representing the difference in the aircraft's distance from said first and second stations and from said first and third stations respectively, an airborne dead reckoning navigation system independent of said ground stations for continuously computing the present latitude and present longitude of said aircraft, means utilizing data indicative of present latitude, present longitude, and the known positions of said stations for continuously computing first and second values representing the difference in said aircraft's distance from said first and second stations and from said first and third stations respectively, as determined by said dead reckoning system, means for comparing said quantities with said values to obtain two error signals, and means for correcting the latitude and longitude indications of said dead reckoning system in accordance with said error signals.

8. Aerial navigation equipment comprising, airborne apparatus for receiving radio signals from first, second and third ground stations of known positions and for generating from said signals first and second quantities representing the difference in the aircraft's distance from said first and second stations and from said first and third stations respectively, an airborne dead reckoning navigation system independent of said ground stations for continuously computing the present latitude and longitude of said aircraft, means for computing the range of said aircraft with respect to each of said stations from data indicative of present latitude, present longitude, and the known positions of said stations, means utilizing data representing said ranges for computing first and second values representing the difference in said aircraft's distance from said first and second stations and from said first and third stations respectively, as determined by said dead reckoning system, means for comparing said quantities with said values to obtain two error signals, and means for correcting the latitude and longitude indications of said dead reckoning system in accordance with said error signals.

9. Aerial navigation equipment comprising, airborne apparatus for receiving radio signals from first, second and third ground stations of known positions and for generating from said signals first and second quantities representing the difference in the aircraft's distance from said first and second stations and from said first and third stations respectively, an airborne dead reckoning navigation system independent of said ground stations for continuously computing the present latitude and longitude of said aircraft, means for computing the range and bearing of each of said stations with respect to said aircraft from data indicative of present latitude, present longitude, and the known positions of said stations, means utilizing data representing said ranges for computing first and second values representing the difference in said aircraft's distance from said first and second stations and from said first and third stations respectively, as determined by said dead reckoning system, means for comparing said quantities with said values to obtain first and second error signals, means utilizing data indicative of said bearings for converting said first and second error signals to third and fourth error signals representing rectangular coordinate differences in said aircraft's position as determined by said apparatus and said dead reckoning system, and means for correcting the latitude and longitude data of said dead reckoning system in accordance with said third and fourth error signals.

10. Navigation equipment comprising, airborne apparatus for receiving signals from first, second and third ground stations of known positions and for generating from said signals first and second quantities representing the difference in the aircraft's distance from said first and second stations and from said first and third stations respectively, an airborne dead reckoning navigation system, independent of said stations, having a pair of integrators for continuously summing information representing aircraft speed and direction to generate data representing present latitude and present longitude of said aircraft, means utilizing data indicative of present latitude, present longitude and the positions of said stations for computing first and second values representing the difference in said aircraft's distance from said first and second stations and from said first and third stations respectively, means for comparing said quantities with said values to generate first and second error signals representing distance-difference errors, means for converting said first and second error signals to third and fourth error signals representing rectangular coordinate displacement errors, and means for applying said third and fourth error signals as additional inputs to said integrators, whereby the latitude and longitude indications of said dead reckoning system are modified in accordance with the signals received by said apparatus.

11. Navigation equipment comprising, a first airborne system for receiving signals from first, second and third ground stations of known positions and for generating quantities representing the difference in the aircraft's distance from said first and second stations and from said first and third stations, a second system including a dead reckoning position computer for computing continuously the present latitude and present longitude of said aircraft, means utilizing data indicative of present latitude, present longitude, and the known locations of said stations for generating data representing the rectangular coordinates of each of said stations with respect to said aircraft, means utilizing the coordinate data for generating data indicative of the range of each of said stations from said aircraft, means utilizing said range data for generating values representing the differences in said aircraft's distance from said first and second stations and from said first and third stations, and means responsive to the differences between said quantities and said values for varying said latitude and longitude data until said differences vanish.

12. Navigation equipment comprising, a first airborne system for receiving radio signals from first, second and third ground stations of known locations and for generating from said signals first and second quantities representing the difference in the aircraft's distance from said first and second stations and from said first and third stations respectively, a second airborne system constituting a dead reckoning navigation system, independent of said ground stations, having first and second integrators for continuously summing information representing aircraft speed and direction to generate data representing the present latitude and present longitude of said aircraft, means utilizing data representing present latitude, present longitude, and the known locations of said ground stations for generating data representing the rectangular coordinates of each of said stations with respect to said aircraft, means utilizing said coordinate data for generating represenations of the range and bearing of each said stations with respect to said aircraft, means utilizing said range representations for generating first and second values representing the difference in said aircraft's distance from said first and said second stations and from said first and said third stations respectively, means for comparing said quantities with said values to obtain first and second error signals representing distance-difference errors, means utilizing said bearing representations for converting said first and second error signals to third and fourth error signals representing rectangular coordinate differences in the position of said aircraft as determined by said first and second systems, and means for applying said third and fourth error signals as additional inputs to said integrators, whereby said data representing present latitude and present longitude is corrected and all of said error signals are brought to zero.

13. Aerial navigation equipment comprising, a first airborne system including a dead reckoning computer for generating data indicative of the present latitude and present longitude of the aircraft, a second system including means for receiving signals from a ground station of known position and for generating from said signals first relative position data in the form of signals representing the range and bearing of said aircraft with respect to said station, means for converting said latitude and longitude data to second relative position data in the form of signals representing the rectangular coordinates of said aircraft with respect to said station, means for comparing said first and second relative position data and for generating error signals representing the difference in range and the difference in lateral position of said aircraft as determined by said two systems, and means controlled by said error signals for applying corrections to said dead reckoning computer.

14. Aerial navigation equipment comprising, a first airborne system including a dead reckoning computer for generating data indicative of the present ltaitude and present longitude of the aircraft, a second system including means for receiving signals from two ground stations of known positions and for generating from said signals first relative position data in the form of signals representing the ranges of said aircraft with respect to each of said stations, means for converting said latitude and longitude data to second relative position data in the form of signals representing the rectangular coordinates of said aircraft with respect to each of said stations, means for comparing said first and second relative position data and for generating error signals representing the difference in the range of said aircraft with respect to each of said stations as determined by said two systems, and means controlled by said error signals for applying corrections to said dead reckoning computer.

15. Aerial navigation equipment comprising, first and second navigation systems each for generating data representing the range of an aircraft from each of two points, means for comparing the range data as generated by said first and second systems to obtain range error signals, and means for transforming said range error signals to rectangular coordinate distance error signals.

16. Aerial navigation equipment comprising, a first airborne system including a dead reckoning computer for generating data indicative of the present latitude and present longitude of the aircraft, a second system including means for receiving signals from two ground stations of known positions and for generating from said signals first relative position data in the form of signals representing the bearings of said aircraft with respect to each of said stations, means for converting said latitude and longitude data to second relative position data in the form of signals representing the rectangular coordinates of said aircraft with respect to said stations, means for comparing said first and second relative position data and for generating error signals representing the difference in the lateral position of said aircraft with respect to each of said stations as determined by said two systems, and means controlled by said error signals for applying corrections to said dead reckoning computer.

References Cited in the file of this patent

UNITED STATES PATENTS 2,652,979    Chance _____ Sept. 22, 1953

OTHER REFERENCES

Galbraith et al.: "The Practical Combination of Air Navigation Techniques," IRE Transactions on Aeronautical and Navigational Electronics, March 1956, pp. 3–10.